(12) United States Patent
Trevathan et al.

(10) Patent No.: US 11,340,893 B2
(45) Date of Patent: May 24, 2022

(54) MOBILE APPLICATION UPDATE PRESERVING CHANGES TO THE APPLICATION MADE BY A CLIENT

(71) Applicant: Kony, Inc., Orlando, FL (US)

(72) Inventors: Matthew B. Trevathan, Roswell, GA (US); Matthew A. Terry, Celebration, FL (US); Jagan Peri, Hyderabad (IN); Satyaprakash Reddy Vennapusa, Hyderabad (IN); Ashish K. Singhal, Hyderabad (IN); Harikrishna Pottabathula, Hyderabad (IN); Dara Kumara Swamy, Vissannapet Mandal (IN)

(73) Assignee: KONY, Inc., Orlando, FL (US)

( * ) Notice: Subject to any disclaimer, the term of this patent is extended or adjusted under 35 U.S.C. 154(b) by 574 days.

(21) Appl. No.: 14/986,082

(22) Filed: Dec. 31, 2015

(65) Prior Publication Data

US 2017/0192773 A1 Jul. 6, 2017

(51) Int. Cl.
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC .... G06F 8/60–68; G06F 3/1225; G06F 3/123; G06F 9/44505; G06F 9/44536; G06F 9/54; G06F 8/71; H04L 41/08–0893
USPC .......................... 717/168–178; 709/220–222
See application file for complete search history.

(56) References Cited

U.S. PATENT DOCUMENTS

| | | | | |
|---|---|---|---|---|
| 7,197,634 B2* | 3/2007 | Kruger | ...................... | G06F 8/64 713/1 |
| 7,281,018 B1* | 10/2007 | Begun | ................... | G06F 17/218 |
| 8,136,090 B2* | 3/2012 | Boss | ................... | G06F 9/44505 717/120 |
| 8,285,864 B2* | 10/2012 | Bagasra | ............... | G06F 9/5055 709/220 |
| 8,572,580 B2* | 10/2013 | Sheehan | ............. | G06F 9/44536 717/121 |
| 9,042,382 B1* | 5/2015 | Nguyen | ........... | H04L 29/12009 370/392 |
| 9,454,363 B1* | 9/2016 | Angell | ...................... | G06F 8/71 |
| 9,733,921 B1* | 8/2017 | Saenz | ...................... | G06F 8/65 |
| 9,851,953 B2* | 12/2017 | Straub | ...................... | G06F 8/34 |
| 9,858,174 B2* | 1/2018 | Straub | ................. | G06F 11/3684 |
| 9,904,534 B2* | 2/2018 | Kuchibhotla | ............. | G06F 8/65 |

(Continued)

*Primary Examiner* — Todd Aguilera
(74) *Attorney, Agent, or Firm* — Andrew M. Calderon; Roberts Calderon Safran & Cole, P.C.

(57) ABSTRACT

Systems and methods for providing an update to a natively rendered application installed on a mobile device are provided. A method includes updating a base application with a unique tailored solution for each client that has created its own unique tailored solution. The method further includes storing, for each client that has created its own unique tailored solution, the base application with its unique tailored solution, as separate versions of the base application in a storage system. The method further includes adding common additional code to each of the separate versions of the base application, while preserving the unique tailored solution for each client that has created its own unique tailored solution. The method further includes pushing the base application with the common additional code to the client.

24 Claims, 6 Drawing Sheets

(56) References Cited

U.S. PATENT DOCUMENTS

| | | | | |
|---|---|---|---|---|
| 9,996,381 | B1* | 6/2018 | Raju | G06F 9/45558 |
| 10,223,097 | B2* | 3/2019 | Weber | G06F 11/3664 |
| 2005/0065953 | A1* | 3/2005 | Bower | G06F 8/48 |
| 2005/0160257 | A1* | 7/2005 | Kruger | G06F 8/64 |
| | | | | 713/2 |
| 2005/0257215 | A1* | 11/2005 | Denby | G06F 8/65 |
| | | | | 717/172 |
| 2006/0224720 | A1* | 10/2006 | Bhogal | G06F 9/5055 |
| | | | | 709/224 |
| 2008/0155534 | A1* | 6/2008 | Boss | G06F 8/61 |
| | | | | 717/178 |
| 2010/0023934 | A1* | 1/2010 | Sheehan | G06F 8/71 |
| | | | | 717/168 |
| 2010/0299664 | A1* | 11/2010 | Taylor | G06F 16/2379 |
| | | | | 717/173 |
| 2011/0061045 | A1* | 3/2011 | Phillips | G06F 9/45541 |
| | | | | 717/173 |
| 2016/0092348 | A1* | 3/2016 | Straub | G06F 11/3684 |
| | | | | 717/124 |
| 2016/0350098 | A1* | 12/2016 | Kuchibhotla | G06F 8/65 |
| 2016/0378439 | A1* | 12/2016 | Straub | G06F 8/61 |
| | | | | 717/107 |
| 2017/0147324 | A1* | 5/2017 | Weber | G06F 8/656 |

\* cited by examiner

MOBILE APPLICATION UPDATE PRESERVING CHANGES TO THE APPLICATION MADE BY A CLIENT

FIELD OF THE INVENTION

The invention relates to mobile applications and, more particularly, to systems and processes for building natively rendered mobile applications using a web based integrated development environment (IDE).

BACKGROUND OF THE INVENTION

Mobile applications (applications) are generally classified as one of native, web, and hybrid. A native application is written in a native programming language for a specific mobile device platform and is executable only on the particular operating system (e.g., iOS, ANDROID, WINDOWS, etc.) associated with the platform. A native application can access the available Application Programming Interface (APIs) of the particular operating system (OS) and can access the mobile device's native platform features (e.g., camera, compass, GPS, etc.). However, a native application written for one mobile platform cannot be used on another, different mobile platform.

It is common for a mobile application to be updated after it has initially been installed on a mobile device. An update may occur, for example, when the developer of the application makes a change to the user interface (UI) and/or logic within the code of the application. Updating a natively rendered application, though, requires the developer to update the entire application, and requires the user to download the entire updated application (e.g., from an app store) and re-install the updated application on their device. Essentially, the update is a complete, stand-alone application that takes the place of the previously installed application. In some cases, updating a native application can be a large operation since the entire application must be updated, downloaded, and re-installed. Moreover, the developer must update the different native applications for each different platform, which can also be very time consuming.

SUMMARY OF THE INVENTION

In a first aspect of the invention, a method for updating a base application includes updating a base application with a unique tailored solution for each client that has created its own unique tailored solution. The method further includes storing, for each client that has created its own unique tailored solution, the base application with its unique tailored solution, as separate versions of the base application in a storage system. The method further includes adding common additional code to each of the separate versions of the base application, while preserving the unique tailored solution for each client that has created its own unique tailored solution. The method further includes pushing the base application with the common additional code to the client.

In another aspect of the invention, a computer program product comprises non-transitory computer readable storage medium having program instructions embodied therewith and which is executable by a computing device to cause the computing device to: publish multiple different configuration changes of a base application which is shared amongst multiple clients to a multi-tenant runtime component; push the multiple different configuration changes of the base application as a new version of the base application to a metadata store for storage, to be shared amongst the multiple clients; leverage the new version of the base application with client specific updates which were made to the base application prior to the publishing; and push the new version of the base application to clients with their own client specific updates.

In yet another aspect of the invention, a system comprises: a CPU, a computer readable memory and a computer readable storage medium; program instructions to save client specific changes of a base application to a metadata store as multiple versions of the base application, the multiple versions of the base application each include a common base code; program instructions to update the multiple versions of the base application with a common change to the base code; and program instructions to push the one of the updated multiple versions of the base application to specific clients with their own client specific changes of the base application. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to mobile applications and, more particularly, to systems and processes for building natively rendered mobile applications using a web based integrated development environment (IDE). In more specific embodiments, the systems and processes described herein use a codeless application where the IDE can configure native applications via a web interface. This allows the deployment of updates (e.g., new functionality) of the application without the need to recompile the application, even when personalized solutions, e.g., changes, are made to the base application by a client. These customized changes are unique tailored solutions for each client that has created its own unique tailored solution. This functionality can range from updated security parameters to newly designed interfaces to a host of other changes.

Advantageously, the systems and processes allow a developer to change the layout of the initial form, e.g., presentation layer of a base application, or provide other new functionality to the base application, and push these changes to the application without the need to recompile the application, and still preserve any functionality (updates) created by the client outside the base application. This latter feature allows different clients to tailor the same base application, which is fully delivered over the cloud, e.g., allowing them to re-skin, deploy and add custom modules, without holding the codebase of the application that is natively deployed.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium is not a transitory signal per se, and is tangible medium that can contain and store the program for use by or in connection with an instruction execution system, apparatus, or device.

Figure 1:
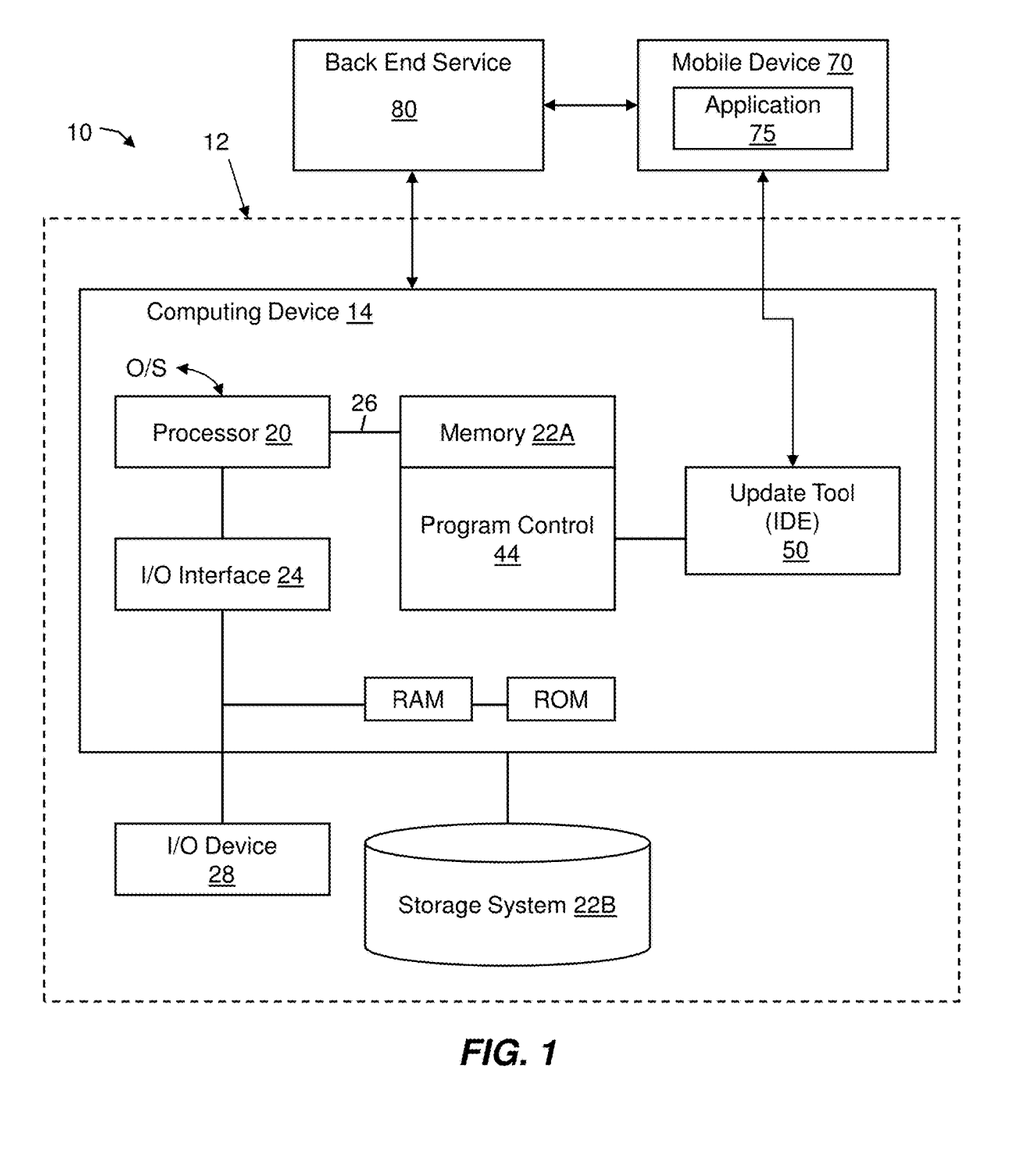
FIG. 1 shows an illustrative environment for managing the processes in accordance with the invention.

FIG. 1 shows an illustrative environment 10 for managing the processes in accordance with the invention. The environment 10 includes a server 12 or other computing system. In embodiments, the server 12 can be a standalone server, which implements the processes of the present invention within a networking environment. That is, the server 12 and/or processes performed by the server 12 can be integrated into the networking environment of any enterprise or provided over the cloud.

In embodiments, the server 12 provides natively rendered applications and updates to the natively rendered applications to one or more mobile devices 70, while preserving any changes (solutions) that the client has made to the base application, amongst other functionality described herein. As used herein, a mobile device refers to a smartphone, tablet computer, personal digital assistant, or similar computing device that includes a mobile operating system, wireless communication antenna, processor, user interface, memory, etc.

The server 12 can be a Mobile Backend as a Service (MBaaS), maintained by a service provider, e.g., Kony Inc. As should be understood by those of ordinary skill in the art, the MbaaS is a model for providing web and mobile app developers with a way to link their applications to backend cloud storage and APIs exposed by backend applications, e.g., provided by backend services 80, while providing features such as user management, push notifications, and integration. In embodiments, the server 12 can also be representative of other types of business enterprise servers, accessible via cloud based applications.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (O/S). The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices (e.g., mobile devices 70 and backend services 80, etc.) using any type of communications link. The processor 20 executes computer program code (e.g., program control 44), which can be stored in the memory 22A and/or storage system 22B. In embodiments, the program control 44 controls an update tool 50 (e.g., web based IDE), which comprises a program that is adapted to perform one or more of the processes described herein. The update tool 50 can be implemented as one or more program code in the program control 44 stored in memory 22A as separate or combined modules. Additionally, the update tool 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention.

In embodiments, the storage system 22B can be a multi-tenant versioning system which can be partitioned to ensure each tenant's (client) data is isolated. The stored data includes the base application (with a common code base) with its unique tailored solution for each client that has created its own unique tailored solution; that is, customized versions of a base application which were pushed by the client into the storage system 22B. In embodiments, the customized versions of the base application can include any number of different tailored solutions (customized changes) provided by any number of different clients, which can be identifiable by version, base application and/or client. That is, the customized versions of the base application are specifically tailored configuration changes created by any number of different clients, with each version linked to a specific base application and client which created the changes to the natively rendered base application. Advantageously, all of the clients can start with a base application that has the same base code, and these base applications can be updated by a developer and pushed to the end user, e.g., mobile device, while still preserving any of the changes to the application that is made by any client. That is, any changes made by the developer will be propagated into the customized version of the base application without overwriting the client changes to the base application.

In embodiments, the different versions of the base application can include the most updated changes or any intervening changes to the base application as created by any number of different clients. To this end, the server 12 and/or storage system 22B can maintain a list of updates and/or versions (of the application), and may map any updated functionality provided by a developer to the updates and/or versions created by the different clients. Based on the comparison, the server determines updates to be provided to the application, e.g., to bring the application into conformity with the list of updates and/or versions, and then can push these updates back to the mobile device, while still preserving any changes made the client.

In embodiments, the base application will leverage the same base code (e.g., codebase) for each tenant (e.g., client). The unique concept that all applications begin with the same codebase provides many advantages including, amongst others:

(i) a single, base application can be deployed and natively rendered on a plurality of different mobile devices 70;

(ii) a client can make configuration changes, e.g., personalized, tailored solutions, without the need to hold the codebase of the application that is natively deployed to the mobile device 70; and (iii) updates can be made to the base application by a developer without the need for the base application to be recompiled each time the updates are redeployed to the mobile device 70.

In further embodiments, by allowing the storage system 22B to store and track customized changes made to the base application, it is also possible to synchronize and apply updates to the many different customized base applications by way of an update tool 50 (e.g., web based IDE), without the need to recompile the application or affecting the different changes (tailored solutions) created by the client. Accordingly, the unique concept that all natively rendered applications begin with the same codebase allows the systems and processes to update the base code, e.g., apply changes to the base application, without affecting configuration changes made by clients of the application. This allows the developer to make product updates while allowing the client to make changes outside of the developer updates of the application.

According to aspects of the invention, the update tool 50 is web based IDE tool which can leverage metadata about the forms (e.g., presentation layer or data objects of associated with the application) that have changes made to them after initial deployment and compilation of the base application. In embodiments, the update tool 50 updates the functionality of the base application, e.g., updates code that provides a layout and/or instructional logic update to the application 75 that is already installed on the mobile device 70. In accordance with aspects of the invention, the instructional logic update can be any added functionality to the natively rendered base application.

In contrast with conventional methods for providing updates to natively rendered applications, the update tool 50 is a web based IDE tool that provides the ability to update customized base applications as stored in the storage system 22B. The update tool 50 (web based IDE tool) can add Javascript based logic to the base application, from the web interface, and automatically update the application on the mobile devices 70 based on changes in the data model.

The use of the web based IDE tool completely eliminates the need for the user to leverage a desktop IDE to make changes to a natively rendered application. By way of more specific example, by using the update tool 50, it is possible to deploy an update to a plurality of different customized base applications stored in the storage system 22B, as created by any number of different clients, and push these updates to the client, e.g., mobile device 70. In this manner, implementations of the invention provide a technical solution to the problem of updating natively rendered applications which have numerous different customizations created by numerous different clients, without affecting the tailored solution or having to recompile the application 75 each time an update is made to the application.

More specifically, the update tool 50 can change an interface or other underlying functionality of the application, with these updates synchronized with the latest or any previous version of the customized application as created by the client and stored and tracked in the storage system 22B. As described herein, any of the updates made by the developer can be provided into the latest version of the customized base application using synchronization methods described herein. This allows the developer to create changes and deploy them in real time to the mobile device 70 from a web based interface. For example, the update tool 50 can also provide critical data mappings and synchronization configurations that connect backend services 80 to the mobile application 75. That is, in embodiments, the update tool 50 can synchronize any application configurations (e.g., updates) as app code to any version of a customized application without recompilation allowing a developer to remap data bindings or data sources to the application without the need to update the application via a full deployment.

In this way, the updated tool 50 (e.g., web based IDE tool) is designed to maximize programmer productivity by presenting a single program in which all development is performed. This updated tool 50 provides features for authoring, modifying, compiling, deploying and debugging the application using a web based interface, even when the application has been customized by the client. Accordingly, base applications can be updated regardless of which backend system 80 is leveraged by the client, e.g., (enterprise), and which changes are made to the base code of the application 75 by the client, all using a centralized web based IDE, i.e., update tool 50.

The program code can include computer program instructions that are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium comprises, for example, any non-transitory medium per se, such as electronic, magnetic, optical, electromagnetic, infrared, and/or semiconductor system. More specific examples (a non-exhaustive list) of the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

Architecture

Figure 2:
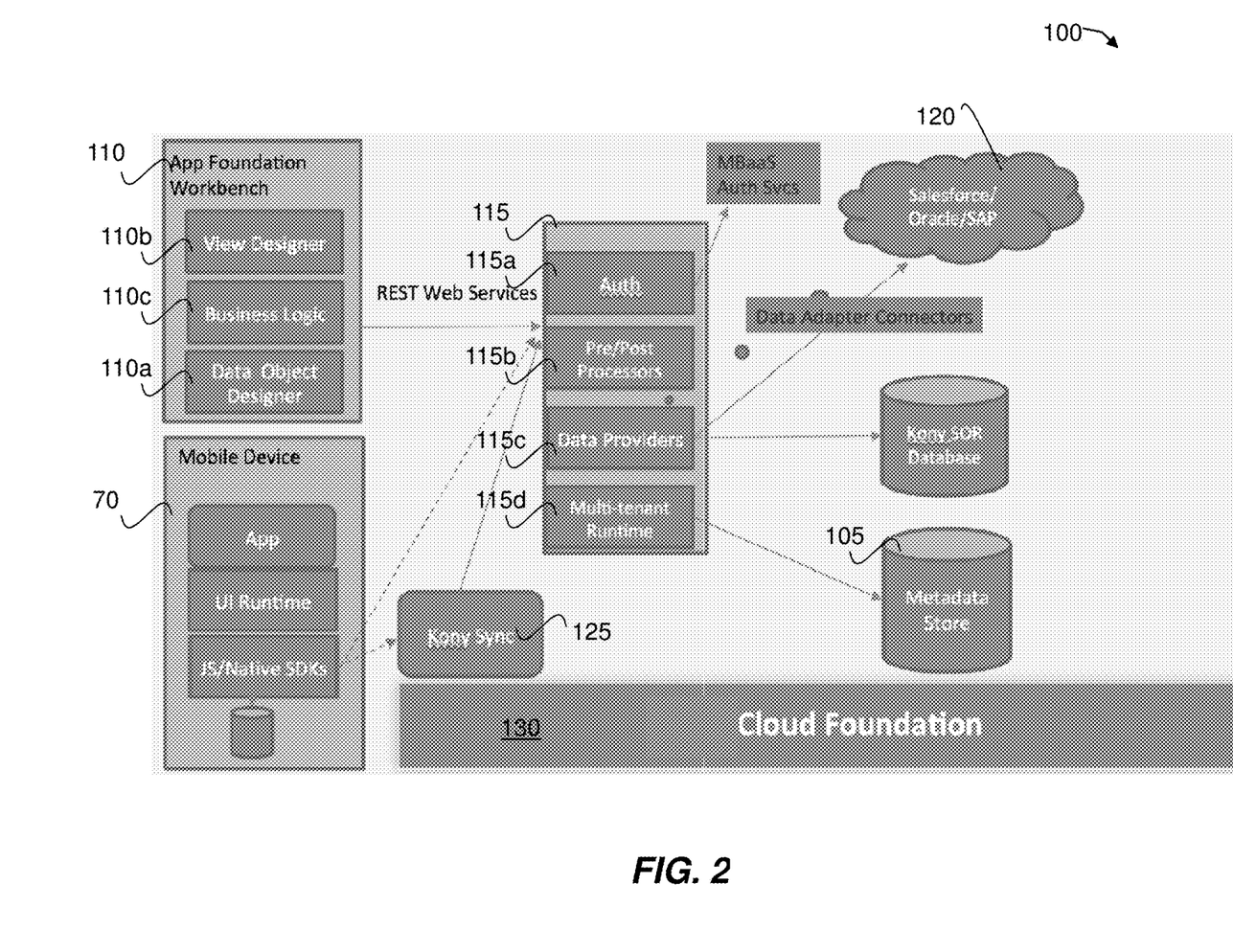
FIG. 2 shows a block diagram of an architecture implemented in accordance with aspects of the invention.

FIG. 2 shows a block diagram of an exemplary architecture implemented in accordance with aspects of the invention. In embodiments, the architecture 100 leverages the systems and processes for providing updates for natively rendered mobile applications as described in U.S. application Ser. No. 14/657,153, the contents of which are incorporated by reference in its entirety herein. For example, the architecture 100 leverages the systems and processes described in U.S. application Ser. No. 14/657,153 as the mobile application runtime that allows deployment of the application to the mobile device 70 without the need to recompile the application.

In embodiments, the mobile application runtime and application are represented on the mobile device 70 as the App and UI Runtime. In embodiments, the App represents the base application and its related functionality, including any customization created by the client and deployed through its enterprise and saved in a metadata store 105 as different versions of the base application. In embodiments, the metadata store 105 can be representative of the storage system 22B of FIG. 1. For example, the metadata store 105 can be a multi-tenant versioning system which stores and tracks different, customizations to the base applications, e.g., customized versions of the base application as created by the client. The mobile device 70 further includes a JS/native SDK, which allows the device to talk to business logic and data objects as should be understood by those of skill in the art.

The architecture 100 further includes an application foundation workbench 110. In effect, the application foundation workbench 110 has control of both the server based end points that control mappings to the backend services 120, as well as the application bindings to the form (e.g., presentation layer or data objects associated with the application (e.g., tables, panes, etc.). This includes synchronization services that need configuration of the base application, as well as the synchronization configuration for accessing the latest versions of an application with solutions (e.g., changes) tailored to a specific client, e.g., accessing the base application with its unique tailored solution for each client that has created its own unique tailored solution.

In embodiments, the application foundation workbench 110 can both change the responses from a web service, e.g., server 115, as well as the bindings to the forms of the base application using a data object designer 110a. As should be understood by those of skill in the art, the data object designer 110a is a tool for developing IDE applications such as Client/Server Integrated Development Environment (C/SIDE) applications using a programming language, e.g., Client/server Application Language (C/AL). In embodiments, the data object designer 110a can provide the following functionality for updating and/or changing forms (e.g., presentation layer) of the base application of any of the clients without overwriting the client changes to the base application, amongst other functions as should be understood by those of skill in the art:

(i) Design new tables, pages, reports, dataports, XMLports, menu suites (navigation panels, etc.) and code units, for example;
(ii) View existing application objects;
(iii) Modify existing application objects; and
(iv) Run an application object.

In embodiments, the application foundation workbench 110 can provide a web based view, e.g., interface, through a view designer module 110b. This view designer module 110b allows the developer to access the tools (e.g., update tool 50, etc.) provided on the server 115, as well as change or update code through the use of business logic 110c through the use of, e.g., the data object designer 110a. In more specific embodiments, the view designer module 110b allows the developer to change the layout of the initial form (e.g., presentation layer of the base application). The initial form will be kept in its base state, but changes to the view can be stored as metadata within the metadata store. Metadata also includes data bindings and business logic that are created outside the base application.

In embodiments, the change or updating of the base code will allow the designer/developer to provide different layout and/or other functionality to each base application that has its unique tailored solution for each client that has created its own unique tailored solution, and that is installed and deployed on the mobile device 70, and which is stored as customized versions in the metadata store 105. The updates to the application can be synchronized with the latest version of the application stored using, e.g., multi-tenant runtime component 115d residing on the server 115. In this way, any changes or updates to the code can be provided to any version of the application, as previously customized by the client. This allows deployment of updates (e.g., new functionality) of the application without the need to recompile the application, even when personalized solutions, e.g., unique tailored solutions (customized changes) made by different clients, are made to the base application by a client. Also, this allows the developer to change the layout of the initial form, e.g., presentation layer (e.g., data objects) of the base application, or provide other new functionality to the application, and push these changes to the application while preserving any functionality (updates) created by the client outside the base application.

The application foundation workbench 110 can communicate with the server 115 using REST web services. In embodiments, the server 115 can be representative of the server 12 or computing device 14 described with respect to FIG. 1, as an example. In embodiments, the server 115 includes authentication services 115a which can authenticate clients, e.g., the server 115 as well as any client or mobile device 70, to the backend services 120. For example, the authentication services 115a can be an MbaaS authentication service which facilitates username/password validation using, e.g., an LDAP server. The authentication services 115a can be installed as a virtual appliance and can communicate using LDAP over SSL. Services supported include security services for user authentication, credential management, and message protection through encryption or other security protocols as should be understood by those of ordinary skill in the art.

The server 115 further includes pre/post processors 115b. In embodiments, the pre/post processors 115b can manipulate how the datasource, i.e., backend service 120, is contacted before or after a call is made to the backend service 120. This may include, for example, encapsulating identification information of the server or other information into the communication request or call (communication package) sent to the backend service 120. In embodiments, the encapsulated information, e.g., logic, can be injected into the package without knowledge of the client, e.g., mobile device 70.

The server 115 further includes data providers 115c, which can identify backend sources 120 to the server 115. This may include access information, e.g., address information, etc., of the backend sources 120 and any related services and data objects which can be exposed by the backend sources 120. This allows the server to identify which backend sources 120 have certain services related to a client request.

The server 115 further includes multi-tenant runtime component 115d. In embodiments, the multi-tenant runtime component 115d can synchronize developer updates with different customized versions of the base application created by the consumer and stored on the metadata store 105. More specifically, the multi-tenant runtime component 115d allows the developer to execute code from multiple tenants within a single process while preserving data integrity of each tenant. In embodiments, the multi-tenant runtime functionality 115d also provides the code for HTTP web APIs wherever it can be accessed with an HTTP call from within the runtime, as should be understood by those of skill in the art. Also, the multi-tenant runtime component 115d allows several applications across multiple tenants (clients) to share the same base application while leveraging unique back end services and front ends (e.g., customizations made by the client) to the individual tenant (client).

The architecture 100 further includes a synchronization tool 125. In embodiments, the synchronization tool 125 provides off-line synchronization with the server 115. For example, the synchronization tool 125 can ensure that the most updated application is deployed on mobile application 70, and that mobile device is synchronized with data records with the metadata store 105. In embodiments, the synchronization tool 125 as well as the server 115, backend services 120 and metadata store 105 can reside on the cloud. e.g., have a cloud foundation 130, supported by a service provider, e.g., Kony Inc.

Swim Lane/Flow Diagrams

Figure 3:
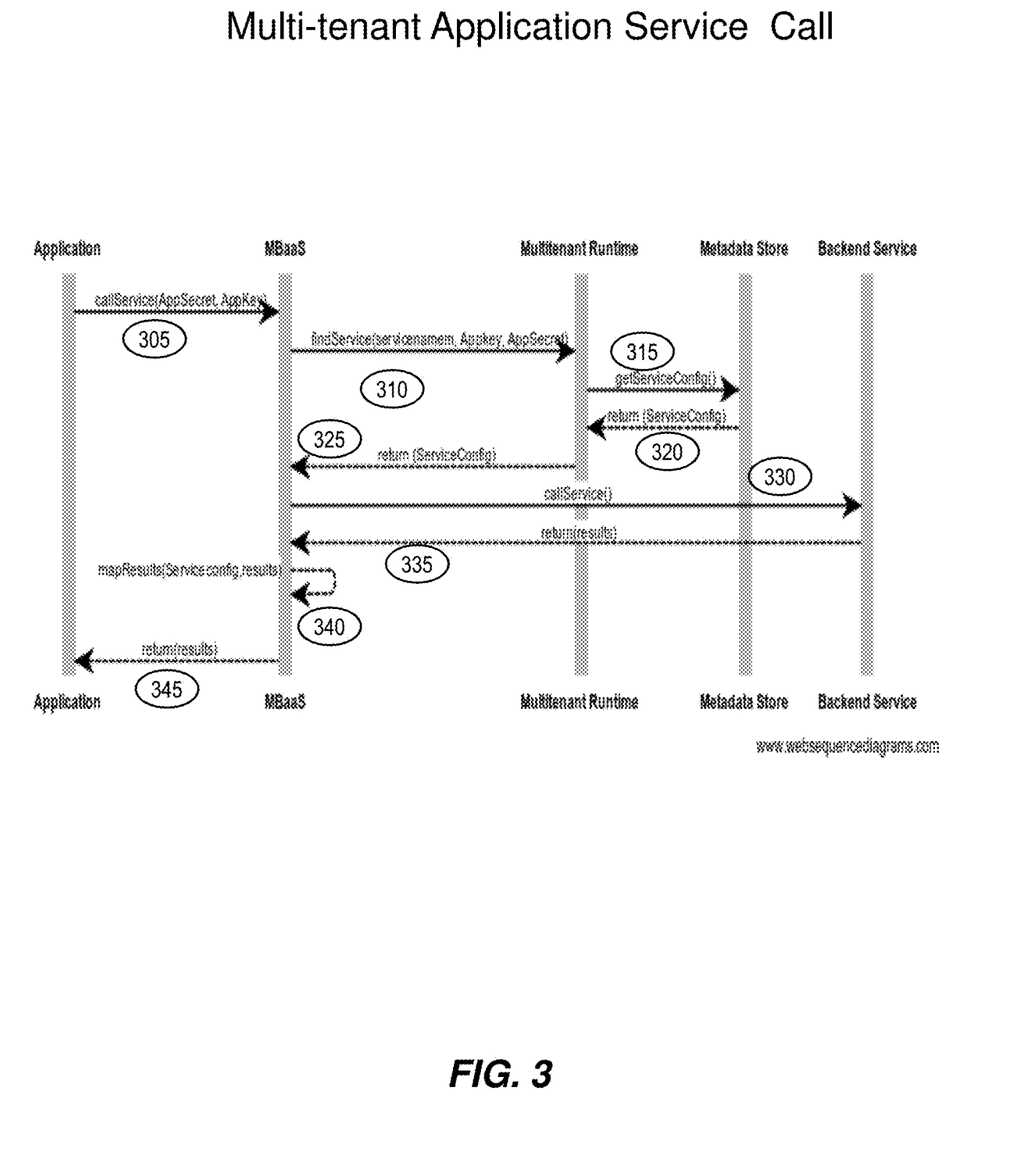
FIGS. 3-5 show flow diagrams of processes in accordance with aspects of the invention.
Figure 4:
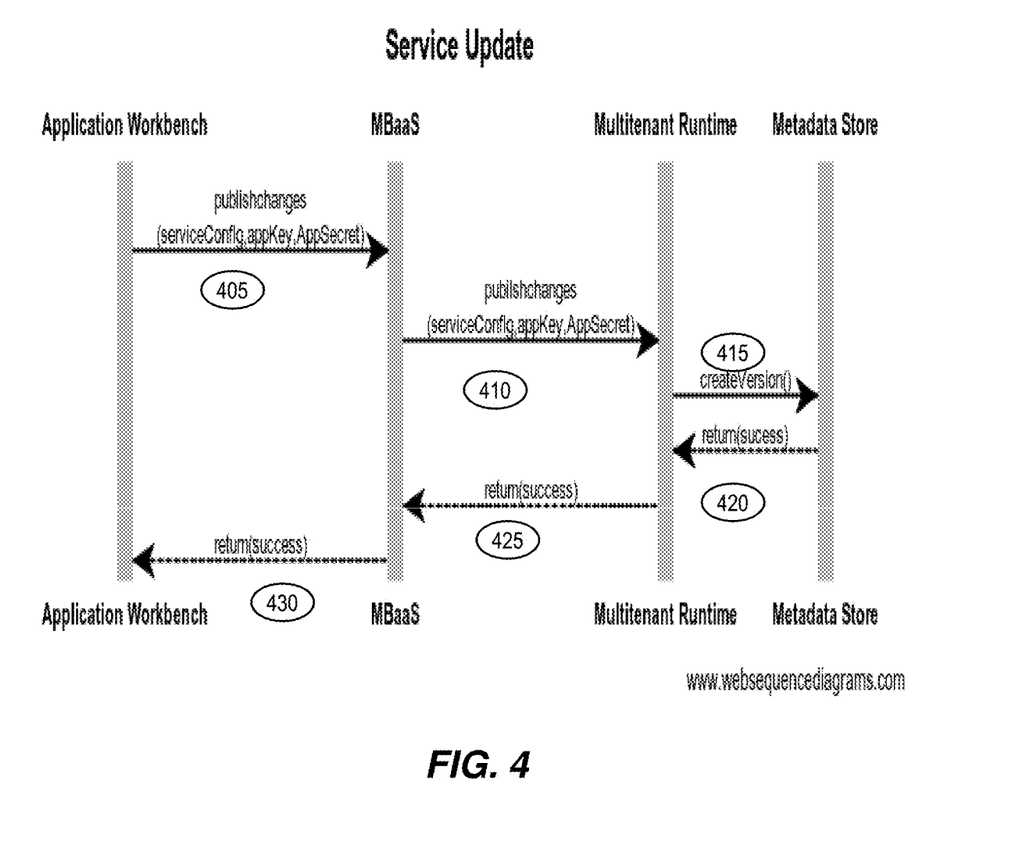
Figure 5:
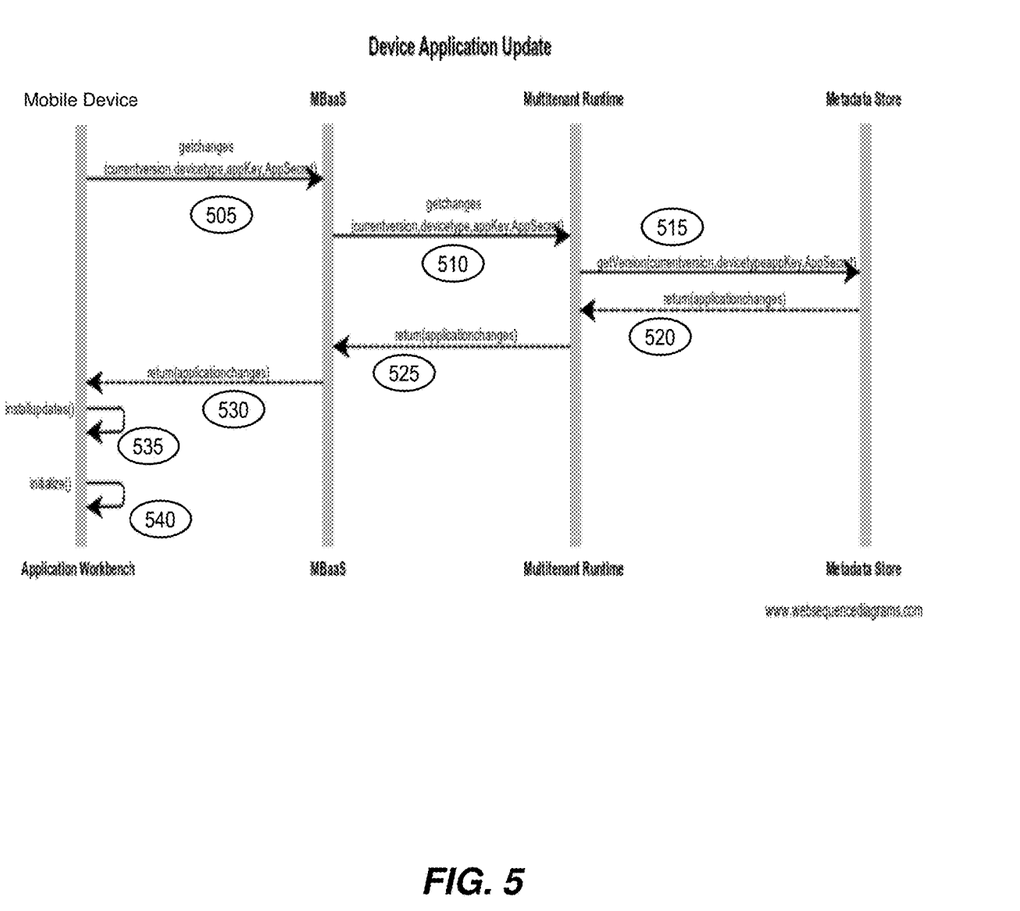

FIGS. 3-5 show swim lane diagrams (e.g., sequence diagrams or flow diagrams) implementing aspects of the present invention. The swim lane diagrams may equally represent a high-level block diagram of the invention. The steps of the swim lane diagrams may be implemented and executed, for example, from either a server, in a client-server relationship, or they may run on a user workstation with operative information conveyed to the user workstation. Furthermore, steps of the processes of the invention may be implemented using a computer-readable storage medium having program code for use by or in connection with a computer or any instruction execution system. The software and/or computer program product can be implemented in the environments of FIGS. 1 and 2.

More specifically, FIG. 3 shows a multi-tenant application service call in accordance with aspects of the present invention. In the example of FIG. 3, the processes are shown to dynamically call a service (retrieving an application and its configuration from one or more datasources) by sending in application information to correctly find the service configuration of the service by retrieving the configuration from the metadata store, calling the service and mapping the result of the service back to a mobile optimized result set based on filtering in the service configuration. The advantage with this process is that is a developer can update the backend bindings as well as the application data bindings by simply publishing the data into the metadata store.

In embodiments, the following components are used in the implementation of processes of FIG. 3: an application (e.g., natively rendered base application 75 (with any customization)), a MBaaS (e.g., server 12 shown FIG. 1 or server 115 shown FIG. 2), a multi-tenant runtime component (e.g., component 115d shown in FIG. 2), a metadata store (e.g., metadata store 105 shown in FIG. 2) and backend services (e.g., backend services shown in FIG. 2). The backend services can be any service provider of applications (e.g., requested services), which can be purchased by the client. Also, the multi-tenant runtime component allows several applications across multiple tenants (clients) to share the same base application while leveraging unique back end services and front ends (e.g., customizations made by the client) to the individual tenant (client) as described herein.

Referring to FIG. 3, at step 305, the application, e.g., a server hosting the application, makes a service call to the server, e.g., MBaaS. In embodiments, the service call should be understood as a request to retrieve any data objects of the base application as updated by a developer (e.g., backend services), in addition to the customized base application created by the client. In embodiments, the service call includes access tokens for the API call such as, e.g., "AppSecret" and "AppKey". "AppSecret" should be understood as a random map provided to the enterprise (e.g., server), whereas, the "AppKey" should be understood as an encryption key.

At step 310, the server requests (e.g., finds) the service by calling the multi-tenant runtime. In embodiments, the server will call the multi-tenant runtime using a "servicename( )", "AppSecret" and "AppKey". As should be understood by those of ordinary skill in the art, "servicename( )" specifies the name of the service to configure. For example, the "servicename( )" specifies the name of the customized base application stored in the metadata store. As should also be understood by those of ordinary skill in the art, the multi-tenant runtime will be able to route the service call to a specific service, e.g., route specific applications to specific clients.

At steps 315, the multi-tenant runtime requests the service (e.g., application which was customized by the client) from the metadata store, which returns the service to the multi-tenant runtime at step 320. In more specific embodiments, the multi-tenant runtime sends a service configuration request ("serviceconfig( )") and receives ("serviceconf") from the metadata store. In this way, the multi-tenant runtime can dynamically receive a specific service (e.g., specific customized base application) for a specific client. More specifically, in this way, the multi-tenant runtime can dynamically receive a specific application from the metadata store which was customized by a client, e.g., a base application which was updated by a specific client. At step 325, the service (e.g., application) is returned to the server.

At step 330, the server can then use the "serviceconf" to call a service (e.g., request data objects of the base application as updated by the developer) from the backend service. At step 335, the service (e.g., data objects of the base application) is returned to the server, at which time the server will map the results, in step 340, to the service received from the metadata store, e.g., (Serviceconfig.results). In other words, the server will map any of the updated data objects of the base application to the same service received from the metadata store, e.g., the customized application created by the client. In this way, it is possible to receive the same data objects for any customized service, update the customized base application and push it to the client (while preserving any previous changes and without the need to recompile the base application). At step 345, the results are returned to the application; that is, the customized application can be updated with the additional object data received from the backend services.

FIG. 4 shows a service update (e.g., update to the base application made by a developer or service provider) in accordance with aspects of the present invention. In the example of FIG. 4, the application workbench publishes a service configuration change (e.g., change to the base application) to the MBaaS. Once the changes are published, they are used during the service call, as the service call will look up the configuration from the metadata store on each call. The solution accepts an optional version number of the service (base application with different changes) allowing the systems and processes to leverage multiple versions of the service by base application. This allows multiple applications used by the same tenant (client) to leverage a service (base application), even though the service is shared by multiple applications (e.g., shared with multiple clients with different unique solutions).

Still referring to FIG. 4, the application workbench can update bindings of data to form elements, visual configurations, business logic and synchronization information using the same processes described herein. In the case of the visual aspects of the application, only the tenant's changes (compared to the base application) are changed creating a tenant specific set of changes to the application. This allows the service provider, e.g., Kony, Inc., to always maintain a base representation of the application thereby allowing the service provider to push base application changes to the application while maintaining customizations by the tenant (client). Also, as shown in FIG. 4, when an application is initialized from the application workbench, it will call back to the MBaaS to retrieve any application specific updates that need to be loaded into a mobile device. This application update can include, e.g., service mappings, data bindings and any configuration data needed by the application or additional business logic and visual configurations.

In embodiments, the following components are used in the implementation of processes of FIG. 4: an application workbench (e.g., workbench 110 shown in FIG. 2), a MBaaS (e.g., server 12 shown FIG. 1 or server 115 shown FIG. 2), a multi-tenant runtime component (e.g., component 115d shown in FIG. 2), and a metadata store (e.g., metadata store 105 shown in FIG. 2). Utilizing these components, for example, as shown at step 405, the application workbench publishes any changes of the base application to the server, e.g., publishes a service configuration change. In embodiments, the application workbench provides a "serviceconfig", "appkey" and "appsecret" during this request or call. At step 410, the MBaaS (e.g., server) publishes the changes to the multi-tenant runtime component which, in turn, pushes the changes, e.g., latest version, of the base application to save on the metadata store at step 415. At step 420, once the changes are saved, the metadata store returns a "success" notification to the multi-tenant runtime component which, in turn, is returned back to the server at step 425. The "success" notification is then sent to the application workbench at step 430.

FIG. 5 shows a device application update in accordance with aspects of the present invention. The example of FIG. 5 illustrates a simplified view of an application update. For example, the application sends an update request with the current version of the application, the multi-tenant runtime retrieves any device application updates and returns them to the device. The shell application installs the updates and initializes the application. Optionally, the localized application configurations can also be loaded by sending a language type to the MBaaS allowing it to retrieve localized visual elements.

In embodiments, the following components are used in the implementation of processes of FIG. 5: a mobile device (e.g., device 70 shown in FIG. 1), a MBaaS (e.g., server 12 shown FIG. 1 or server 115 shown FIG. 2), a multi-tenant runtime component (e.g., component 115d shown in FIG. 2), and a metadata store (e.g., metadata store 105 shown in FIG. 2). More specifically, at step 505, the mobile device requests changes by calling the server, i.e., "currentversion", "devicetype", "appkey" and "appsecret". Here, "currentversion" should be understood as a request for the most current version of the application, whereas, "devicetype" should be understood as an identification of the device type of the mobile device. At step 510, the server calls to the multi-tenant runtime component to obtain the requested version of the application. In this step, the server passes to the multi-tenant runtime component "currentversion", "devicetype", "appkey" and "appsecret".

At step 515, the multi-tenant runtime component requests the updated version of the application from the metadata store. At step 520, the metadata store returns the application changes to the multi-tenant runtime component which, in turn, is sent to the server at step 525. At step 530, the application changes are sent to the mobile device. The mobile application will then install and initialize the updates at steps 535 and 540, respectively. The application changes, though, do not need to be recompiled. In this way, an application can be initialized with the updates after calling to the backend services, and loading a copy of the updates to the base application onto the device.

Accordingly, as should now be understood, all the natively rendered applications can begin with the same codebase and, when an update needs to happen to the base code, it is now possible to apply the changes to the base application without effecting configuration changes made by clients of the application. This allows service provider or backend services to make a product update while allowing the client to make changes outside of such upgrade.

Additional Aspects

Figure 6:
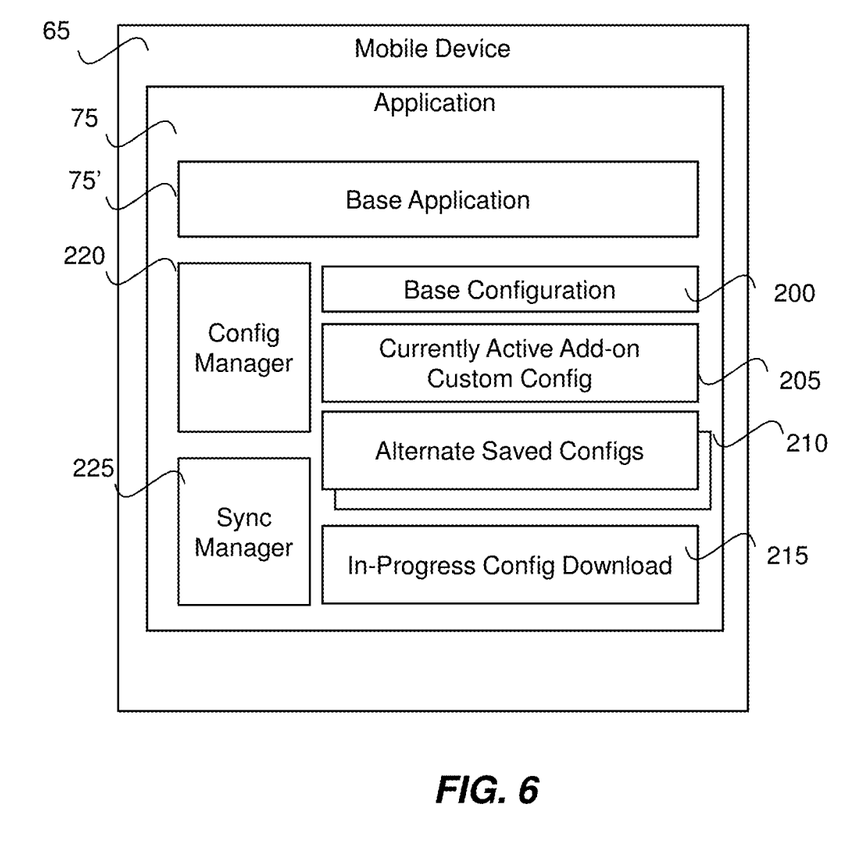
FIG. 6 shows another block diagram of an mobile application architecture implemented in accordance with aspects of the invention.

FIG. 6 shows a block diagram of the mobile application architecture implemented in accordance with aspects of the invention. As shown in FIG. 6, the mobile device 65 can include the application 75. The application 75 can include the base application 75' with the base configuration 200, in addition to an active add-on custom configuration 205, an alternative saved configuration 210 and an in-progress configuration download 215. In embodiments, the custom configuration 205, alternative saved configuration 210 and an in-progress configuration download 215 can be different customizations to the base application 75, e.g., customized versions of the base application as created by the client.

In operation, the mobile application can be implemented by a client that services different types of end-user personas owned by different business units. By way of example, a plant maintenance application can service different types of end-user personas owned by different business units. Illustratively, one group is in charge of routine maintenance where another group is responsible for service tickets for repairs. In this scenario and others, the base application 75' can supports both workloads, but based on the end-use persona the client can customize the experience in different ways.

In embodiments, the call out of the downloaded configuration, e.g., in progress configuration download 215, can be at-runtime and can be based on an end-user profile. In embodiments, the management of what end-users are assigned to what profile can be managed in the backend systems, e.g., server 115 of FIG. 2. That is, the mapping of the end-user to profile can occur at the server 115. Additionally, the granularity of the custom configuration download can be based on the end-user identity, as well as on an attribute of that user such as region, role, or organization unit designation. In embodiments, it is also possible to factor in other external factors such as current location so that different configurations are downloaded for different organizations, e.g., manufacturing plant locations.

In additional embodiments, the management of multiple configurations can be provided on a single device 65. For example, the single device 65 could be used by multiple end-users that map to different custom configurations, e.g., a manufacturing plant that runs three shifts and they aren't going to buy each end-user a dedicated device. In this way, the application 75 does not need to keep re-downloading custom configurations each time a different type of user logs in or when the device 65 is utilized in different locations. To achieve this, it is possible to incorporate active custom configurations, e.g., current active add-on custom configuration 205, and alternate configurations, e.g., alternate saved configurations 220, in the base application 75.

In embodiments, the active custom configurations and alternate configurations can be cached so that they do not need to be downloaded to each device of an enterprise. In this way, the first time the active custom configurations and alternate configurations is needed, it can be downloaded and cached. Then, the next time it is rotated in, it is readily available without waiting for a download from the backend system.

Still referring to FIG. 6, the application 75 or the mobile device 65, itself, can further include a built-in configuration manager 220 and a synchronization manager 225. In operation, on each application start, the built-in configuration manager 220 checks for an updated configuration for that end-user. If one is found, there would be no need to re-download the entire configuration; instead, the processes (e.g., built-in configuration manager 220) can identify the changes (deltas) between the local configuration and the new configuration. The synchronization manager 225 would then synchronize the deltas (e.g., differences with the base configuration of the base application) to reduce the amount of time required to update the local configuration (e.g., base configuration).

Advantageously, the end user will not need to wait on the synchronization manager 225. For example, although syncing the deltas will be faster than a full download, there could be an urgent repair needed and the network connectivity could be extremely slow. In this and other scenarios, the built-in configuration manager 220 works together with the synchronization manager 225 to immediately load the latest full version of the configuration for the end-user and allows the application 75 to start using that base configuration. The synchronization manager 225 then executes in the background to pull down the deltas. Once all the changes are downloaded, it can prompt the user to apply the new configurations.

In addition, the configuration update could be marked in some way such as priority=critical versus priority=normal which would trigger the built-in configuration manager 220 to decide if the end-user is allowed to continue using the application on the older cached configuration while the newer configuration is downloading (priority=normal) or if the user must wait for the update to complete before using the application (priority=critical).

In embodiments, a service provider, such as a Solution Integrator, could offer to perform the processes described herein. In this case, the service provider can create, maintain, deploy, support, etc., the computer infrastructure that performs the process steps of the invention for one or more clients. These clients may be, for example, any business that uses technology. In return, the service provider can receive payment from the client(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method of providing an update, using a server, to a natively rendered application installed on mobile devices of a plurality of clients, comprising:

updating, using the server, a base application created by a developer with a unique tailored solution for each client that has created its own unique tailored solution, wherein the base application with its unique tailored solution for each client that has created its own unique tailored solution starts with common base code shared amongst each version of the base application, and wherein the server is comprised of a centralized web based integrated development environment (IDE) tool;

storing, using the server, for each client that has created its own unique tailored solution, the base application with its unique tailored solution, as separate versions of the base application in a storage system separate from mobile devices of the clients;

making changes to the common base code of the base application, using the server, by adding common additional code to each of the separate versions of the base application to create updates, without affecting client changes made by each client in creating the unique tailored solution for each client that has created its own unique tailored solution, wherein making the changes includes synchronizing any of the updates for the base application with any version of the base application with its unique tailored solution for each client that has created its own unique tailored solution using a multi-tenant runtime component residing in the server, separate from the mobile devices;

pushing, using the server, the updates with the common additional code from the server to the mobile devices of the clients while still preserving the client changes made prior to the adding of the common additional code for any version of the base application with its unique tailored solution, and without recompilation of the natively rendered application installed on the mobile devices;

creating, using the server, an in-progress configuration download which is a customized version of the base application;

caching, using the server, the in-progress configuration download in the mobile devices of the clients;

determine, using the server, an end-user profile which corresponds with the cached in-progress configuration download; and run the cached in-progress configuration download to a plurality of end-users which are associated with the end-user profile, wherein adding the common additional code is performed by the centralized web based integrated development environment (IDE) tool configured to present a single program, using the multi-tenant runtime component residing in the server, the IDE tool performs development for adding the common additional code, and the multi-tenant runtime component leverages backend services unique to each client, and wherein the common additional code includes metadata about a presentation layer or data objects associated with the base application that have changes made to presentation layer or data objects, after initial deployment and compilation of the base application, without recompilation of the natively rendered application installed on the mobile devices, the unique tailored solution for each client is pushed to mobile devices with the common additional code, and the multi-tenant runtime component is configured to execute code from multiple clients within a single process while preserving data integrity of each client, and the centralized web based integrated development environment (IDE) adds script logic to the base application from a web interface and automatically updates the base application on the mobile devices based on changes in a data model.

2. The method of claim 1, wherein the IDE tool updates the functionality of the base application by updating codes that provide a layout and/or instructional logic updates to the base application.

3. The method of claim 2, wherein the base application with its unique tailored solution is identified with a respective one of each client that has created its own unique tailored solution.

4. The method of claim 3, wherein the single program, in which the development for adding the common additional code to the common base code of each of the versions of the base application is performed, is configured to provide operations for: authoring; modifying; compiling; deploying; and debugging each of the separate versions of the base application.

5. The method of claim 4, wherein the IDE tool has control of both server based end points that control mappings to backend services and bindings to object data of the base application.

6. The method of claim 5, wherein the bindings are to a form of the base application.

7. The method of claim 6, wherein each base application with its unique changes is stored in its base state with the unique changes in a multi-tenant versioning system.

8. The method of claim 7, wherein deployment of the updates of the base application avoids recompiling of the base application, even when the unique tailored solutions are made to the base application by the client.

9. The method of claim 6, wherein any updates to a base code of the base application is provided to any version of the base application with the unique tailored solutions created by the clients.

10. The method of claim 1, further comprising downloading a configuration of the common base code at-runtime based on the end-user profile.

11. The method of claim 1, wherein the separate versions of the base application are stored in a metadata store in the storage system, wherein the multi-tenant runtime component shares a same base application between several applications across multiple clients while leveraging backend services and the unique tailored solutions of the multiple clients, and wherein the multi-tenant runtime component of the centralized integrated development environment web-based IDE tool is further configured to include data mappings and synchronization configurations for connecting backend services for the base application shared by each of the multiple versions of the base application to remap data bindings and/or data sources of the base application.

12. The method of claim 11, wherein the metadata store is a multi-tenant versioning system configured to store and track the separate versions of the base application.

13. The method of claim 12, wherein the multi-tenant versioning system is partitioned to ensure that each client's data is isolated from the data of other clients.

14. A computer program product comprising non-transitory computer readable storage medium having program instructions embodied therewith, the program instructions being executable by a computing device in a server to cause the computing device to:
publish multiple different configuration changes of a base application which is shared amongst multiple clients to a multi-tenant runtime component, wherein the base application is created by a developer, wherein the base application with its multiple different configuration changes for each client that has created its own different configuration change starts with common base code shared amongst each version of the base application;
push the multiple different configuration changes of the base application as separate versions of the base application to a metadata store for storage;
leverage the separate versions of the base application with client specific updates which were made to the base application prior to the publishing by making changes to the common base code of the base application of each of the separate versions by adding common additional code to each of the separate versions of the base application to create updates, without affecting client changes made by each client in creating the different configuration changes for each client that has created its own different configuration change; and
push the separate versions of the base application to mobile devices of the clients with their own client specific updates made prior to the leveraging of the multiple different configuration changes of the base application,
wherein the program instructions cause the computing device to maintain a base representation of the base application and push changes of the base application without affecting the multiple different configuration changes of the base application made by the multiple clients to the base application for any of multiple different configuration changes of the base application for any separate version of the base application with client specific updates,
wherein the server is comprised of a centralized web based integrated development environment (IDE) tool, and
wherein the program instructions executable by the computing device cause the computing device to:
identify changes between a local configuration and a new configuration;
synchronize differences between the local configuration and the new configuration to reduce an amount of time required to update the local configuration with the new configuration using the multi-tenant runtime component residing in the server, separate from mobile devices of each of the clients, prior to pushing the new version of the base application to the mobile devices of the clients, without recompiling versions of the base application with the client specific updates stored in the mobile devices of the clients;
create an in-progress configuration download which is a customized version of the base application;
cache the in-progress configuration download in the mobile devices of the clients;
determine an end-user profile which corresponds with the cached in-progress configuration download; and
run the cached in-progress configuration download to a plurality of end-users which are associated with the end-user profile,
wherein the leveraging is performed by the centralized web based integrated development environment (IDE) tool configured to present a single program, using the multi-tenant runtime component, the IDE tool performs development for the publishing of the multiple different configuration changes of the base application, and the multi-tenant runtime component leverages backend services unique to the each client, and wherein the common additional code includes metadata about at least one of a presentation layer or data objects associated with the base application that have changes made to presentation layer or data objects after initial deployment and compilation of the base application, without recompilation of the separate versions of the base application with the client specific updates stored in the mobile devices of the clients, wherein the IDE tool updates the functionality of the base application by updating codes that provide a layout and/or instructional logic updates to the base application.

15. The computer program product of claim 14, wherein the program instructions cause the computing device to return a success notification that the configuration changes have been saved.

16. The computer program product of claim 14, wherein the program instructions cause the computing device to look up the configuration changes from the metadata store on each service call.

17. The computer program product of claim 14, wherein the program instructions cause the computing device to synchronize the base application with the multiple different configuration changes of the base application with the client specific updates.

18. The computer program product of claim 14, wherein the program instructions cause the computing device to update bindings of data to form elements, visual configurations, business logic and synchronization information of the base application.

19. The computer program product of claim 14, wherein the program instructions cause the computing device to retrieve any application specific updates that need to be loaded into a mobile device, including service mappings, data bindings and any configuration data needed.

20. The computer program product of claim 14, wherein the new version of the base application requires installation and initialization on a mobile device without recompiling.

21. The computer program product of claim 14, wherein the multiple different configuration changes include an active custom configuration and one or more alternate configurations.

22. The computer program product of claim 21, wherein the active custom configuration and one or more alternate configurations are cached configurations.

23. The computer program product of claim 14, wherein the program instructions executable by the computing device cause the computing device to:
   load the new configuration for a particular end-user in a background, while the base application is running, and after synchronization, run the local configuration with the new configuration.

24. A system comprising:
   a server including a CPU, a computer readable memory and a computer readable storage medium, wherein the server is comprised of a centralized web based integrated development environment (IDE) tool;
   program instructions to save client specific changes of a base application, respectively made by specific clients, to a metadata store as multiple versions of the base application, the multiple versions of the base application each include a common base code, wherein the base application is created by a developer, wherein the multiple versions of the base application each start with the common base code shared amongst each of the multiple versions of the base application;
   program instructions to update the multiple versions of the base application with a common change to the base code without affecting the client specific changes to each of the stored multiple versions of the base application, wherein the program instructions to update the multiple versions of the base application include program instructions to respectively synchronize any of the updates of the base application with any of the multiple versions of the base application stored in the metadata store using a multi-tenant runtime component residing in the server, separate from mobile devices of each of the clients;
   program instructions to push the updated multiple versions of the base application to mobile devices of the specific clients with their own client specific changes of the base application made prior to the adding of the common change to the base code for any version of the base application with its unique tailored solution, without recompiling versions of the base application stored in the mobile devices of the clients;
   program instructions to create an in-progress configuration download which is a customized version of the base application;
   program instructions to cache the in-progress configuration download in the mobile devices of the clients;
   program instructions to determine an end-user profile which corresponds with the cached in-progress configuration download; and
   program instructions to run the cached in-progress configuration download to a plurality of end-users which are associated with the end-user profile,
   wherein the program instructions are stored on the computer readable storage medium for execution by the CPU via the computer readable memory, and
   wherein the updating of the multiple versions of the base application with a common change to the base code is performed by the centralized web based integrated development environment (IDE) tool and the multi-tenant runtime component is configured to present a single program for the updating of the multiple versions of the base application with a common change to the base code, and wherein the common change to the base code includes data mappings and synchronization configurations for connecting backend services for the base application shared by each of the multiple versions of the base application to remap data bindings and/or data sources of the base application, without recompilation of the versions of the base application stored in the mobile devices,
   the unique tailored solution for each client is pushed to mobile devices with the common change to the base code, and the multi-tenant runtime component is configured to execute code from multiple clients within a single process while preserving data integrity of each client, and
   the in-progress configuration download is marked as one of a critical priority and a normal priority, and
   the end-users associated with the end-user profile must wait for the cached in-progress configuration download marked as the critical priority to be run before using the base application.

\* \* \* \* \*